(12) United States Patent
K. A. et al.

(10) Patent No.: US 10,296,395 B2
(45) Date of Patent: *May 21, 2019

(54) PERFORMING A ROOTED-V COLLECTIVE OPERATION BY AN OPERATIONAL GROUP OF COMPUTE NODES IN A PARALLEL COMPUTER

(71) Applicant: International Business Machines Corporation, Armonk, NY (US)

(72) Inventors: Nysal Jan K. A., Bangalore (IN); Sameh S. Sharkawi, Cypress, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 406 days.

This patent is subject to a terminal disclaimer.

(21) Appl. No.: 15/149,322

(22) Filed: May 9, 2016

(65) Prior Publication Data

US 2017/0322835 A1 Nov. 9, 2017

(51) Int. Cl.
*G06F 7/00* (2006.01)
*G06F 9/50* (2006.01)

(52) U.S. Cl.
CPC ................. *G06F 9/5066* (2013.01)

(58) Field of Classification Search
CPC ... G06F 15/17318; G06F 9/5066; G06F 9/542
See application file for complete search history.

(56) References Cited

U.S. PATENT DOCUMENTS

| 7,886,084 B2 | 2/2011 | Chen et al. |
| 8,484,658 B2 | 7/2013 | Davis et al. |
| 2008/0101232 A1 | 5/2008 | Archer et al. |
| 2010/0274997 A1* | 10/2010 | Archer .............. G06F 15/17318 712/225 |
| 2011/0267197 A1 | 11/2011 | Archer et al. |
| 2012/0036255 A1 | 2/2012 | Polsky |
| 2012/0254344 A1 | 10/2012 | Archer et al. |
| 2013/0191851 A1 | 7/2013 | Archer et al. |

(Continued)

OTHER PUBLICATIONS

George M. Slota et al. "Complex Network Analysis using Parallel Approximate Motif Counting", p. 405-414 (Year: 2014).*

(Continued)

*Primary Examiner* — Andy Ho
*Assistant Examiner* — Abdou Kseye
(74) *Attorney, Agent, or Firm* — David M. Quinn

(57) ABSTRACT

Performing a rooted-v collective operation by an operational group of compute nodes in a parallel computer includes: upon encountering a rooted-v collection operation during execution, identifying, by a root node of an operational group of compute nodes, a count to use for the selection of a collective algorithm for effecting the rooted-v collective operation; broadcasting, by the root node to the other computer nodes in the operational group, an active message, wherein the active message includes the identified count to use for the selection of the collective algorithm; and selecting, by all the compute nodes of the operational group based on the identified count, a same collective algorithm to effect the rooted-v collective operation; and executing the rooted-v collective operation by all compute nodes of the operational group using the selected algorithm.

20 Claims, 9 Drawing Sheets

(56) References Cited

U.S. PATENT DOCUMENTS

| | | |
|---|---|---|
| 2013/0212145 A1 | 8/2013 | Archer et al. |
| 2014/0075452 A1 | 3/2014 | Supalov et al. |
| 2014/0281723 A1 | 9/2014 | Archer et al. |
| 2014/0282429 A1* | 9/2014 | Archer ............... G06F 11/3409 717/130 |
| 2016/0077998 A1 | 3/2016 | Archer et al. |

OTHER PUBLICATIONS

Manjunath Gorentla et al. "Exploring the All-To-All Collective OptimizationSpace with ConnectX CORE-Direct", pp. 289-298 (Year: 2012).*

IBM et al., "Method for optimizing message handling for streaming I/O operations", An IP.com Prior Art Database Technical Disclosure, Feb. 16, 2007, pp. 1-4, IP.com Electronic Publication, IP.com No. IPCOM000146556D, URL: http://ip.com/IPCOM/000146556.

Balaji et al., Title: "MPI on a Million Processors", Book Title: "Recent Advances in Parallel Virtual Machine and Message Passing Interface", Book Subtitle: Proceedings, 16th European PVM/MPI Users' Group Meeting, Espoo, Finland, Sep. 7-10, 2009, pp. 20-30, Springer Berlin Heidelberg. DOI: 10.1007/978-3-642-03770-2_9.

Appendix P; List of IBM Patent or Applications Treated as Related, May 25, 2016, 2 pages.

Pješivac-Grbović et al., "Decision Trees and MPI Collective Algorithm Selection Problem", Euro-Par 2007 Parallel Processing, vol. 4641 of the series Lecture Notes in Computer Science, Aug. 2007, pp. 107-117, Springer Berlin Heidelberg New York, USA.

Thakur et al., "Optimization of Collective Communication Operations in MPICH", The International Journal of High Performance Computing Applications, vol. 19, No. 1, Feb. 2005, pp. 49-66, Sage Publications, Inc., Thousand Oaks Ca, USA.

Hartmann et al., "A Decomposition Approach for Optimizing the Performance of MPI Libraries", 20th International Parallel and Distributed Processing Symposium, (IPDPS2006), Apr. 2006, 8 pages, IEEE Xplore Digital Library (online), DOI: 10.1109/IPDPS. 2006.1639721.

Gupta et al., "Application-Oriented Adaptive MPI_Bcast for Grids", 20th International Parallel and Distributed Processing Symposium (IPDPS2006), Apr. 2006, 10 pages, IEEE Xplore Digital Library (online), DOI: 10.1109/IPDPS.2006.1639363.

Faraj et al., "STAR-MPI: Self Tuned Adaptive Routines for MPI Collective Operations", Proceedings of the 20th Annual International Conference on Supercomputing, Jun. 2006, 10 pages, ACM, New York, NY, DOI: 10.1145/1183401.1183431.

* cited by examiner

PERFORMING A ROOTED-V COLLECTIVE OPERATION BY AN OPERATIONAL GROUP OF COMPUTE NODES IN A PARALLEL COMPUTER

BACKGROUND

Field of the Invention

The field of the invention is data processing, or, more specifically, methods, apparatus, and products for performing a rooted-v collective operation by an operational group of compute nodes in a parallel computer.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In such a manner, a torus network lends itself to point to point operations. In a tree network, the nodes typically are connected into a binary tree: each node has a parent, and two children (although some nodes may only have zero children or one child, depending on the hardware configuration). Although a tree network typically is inefficient in point to point communication, a tree network does provide high bandwidth and low latency for certain collective operations, message passing operations where all compute nodes participate simultaneously, such as, for example, an allgather operation. In computers that use a torus and a tree network, the two networks typically are implemented independently of one another, with separate routing circuits, separate physical links, and separate message buffers.

In some parallel computers, each compute node may execute one or more tasks—a process of execution for a parallel application. Each tasks may include a number of endpoints. Each endpoint is a data communications endpoint that supports communications among many other endpoints and tasks. In this way, endpoints support collective operations in a parallel computer by supporting the underlying message passing responsibilities carried out during a collective operation. In some parallel computers, each compute node may execute a single tasks including a single endpoint. For example, a parallel computer that operates with the Message Passing Interface ('MPI') described below in more detail may execute a single rank on each compute node of the parallel computer. In such implementations, the terms task, endpoint, and rank are effectively synonymous.

Many different algorithms may be employed to effect a single collective operation. Such algorithms may be tuned so that the operation is more efficient for a particular characteristic of the operational group or collective operation. Message size, topology, network type, number of compute nodes in an operational group, hardware acceleration availability and the like are some example characteristics of an operational group or collective operation for which algorithms are tuned for efficiency. Selection of such algorithms during execution becomes more critical as size of operational groups and data size of messaging increases.

SUMMARY

Methods, apparatus, and products for performing a rooted-v collective operation by an operational group of compute nodes in a parallel computer are disclosed in this specification. Such methods include: identifying, in source code by a collective algorithm selection optimizing module, a gather operation followed by a rooted-v collective operation; replacing, by the collective algorithm selection optimizing module, the gather operation with an allgather operation; executing, by the compute nodes, the allgather operation; selecting, by each compute node in dependence upon results of the allgather operation, an algorithm for effecting the rooted-v collective operation; and executing, by each compute node, the rooted-v collective operation with the selected algorithm.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
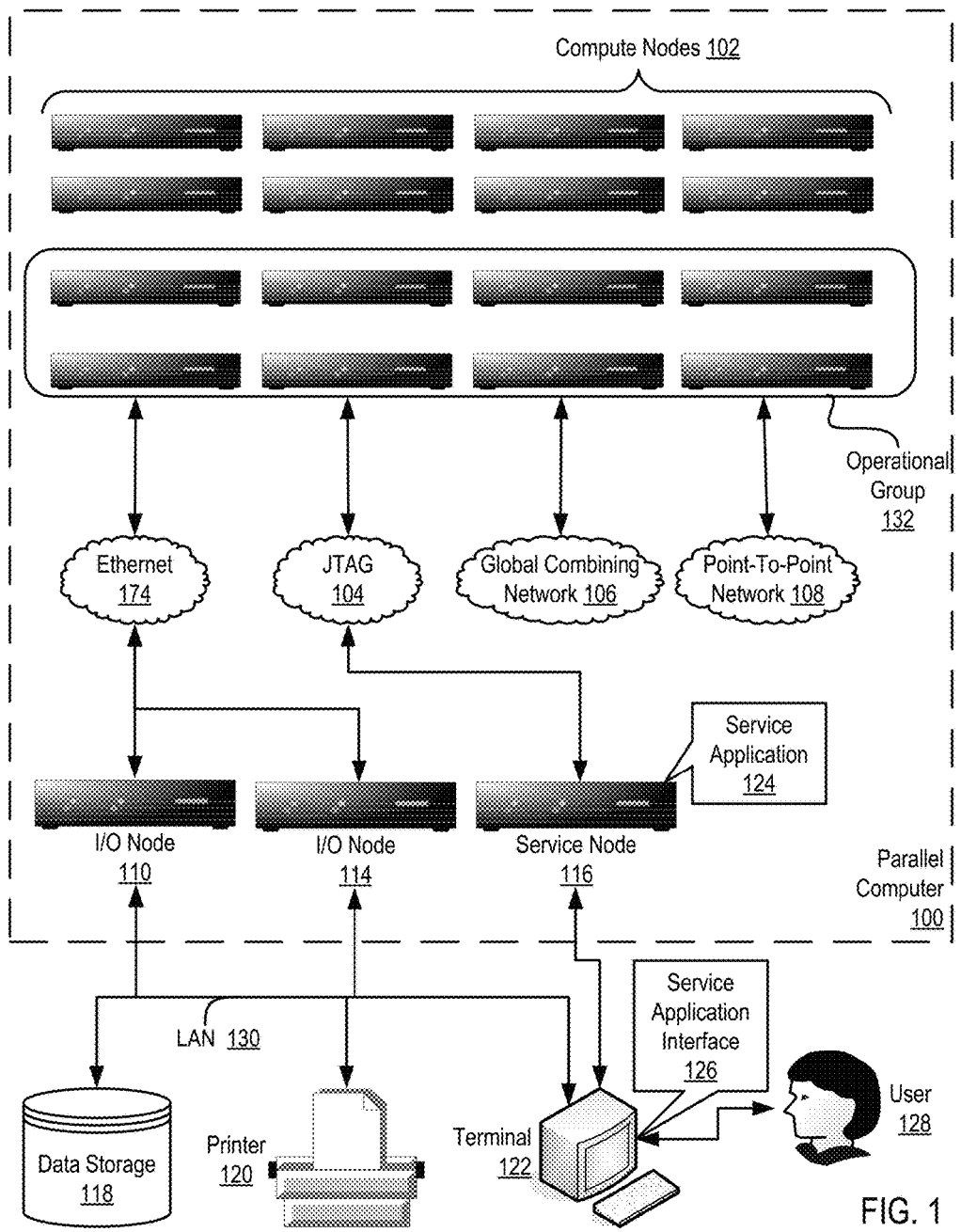
FIG. 1 illustrates an exemplary system for performing a rooted-v collective operation by an operational group of compute nodes in a parallel computer according to embodiments of the present invention.

Exemplary methods, apparatus, and products for performing a rooted-v collective operation by an operational group of compute nodes in a parallel computer in accordance with the present invention are described with reference to the accompanying drawings, beginning with FIG. 1. FIG. 1 illustrates an exemplary system for performing a rooted-v collective operation by an operational group of compute nodes in a parallel computer according to embodiments of the present invention. The system of FIG. 1 includes a parallel computer (100), non-volatile memory for the computer in the form of a data storage device (118), an output device for the computer in the form of a printer (120), and an input/output device for the computer in the form of a computer terminal (122).

The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point-to-point network (108), which is optimized for point-to-point operations using a torus network topology. The global combining network (106) is a data communications network that includes data communications links connected to the compute nodes (102) so as to organize the compute nodes (102) as a binary tree. Each data communications network is implemented with data communications links among the compute nodes (102). The data communications links provide data communications for parallel operations among the compute nodes (102) of the parallel computer (100).

The compute nodes (102) of the parallel computer (100) are organized into at least one operational group (132) of compute nodes for collective parallel operations on the parallel computer (100). Each operational group (132) of compute nodes is the set of compute nodes upon which a collective parallel operation executes. Each compute node in the operational group (132) is assigned a unique rank that identifies the particular compute node in the operational group (132). Collective operations are implemented with data communications among the compute nodes of an operational group. Collective operations are those functions that involve all the compute nodes of an operational group (132). A collective operation is an operation, a message-passing computer program instruction that is executed simultaneously, that is, at approximately the same time, by all the compute nodes in an operational group (132) of compute nodes. Such an operational group (132) may include all the compute nodes (102) in a parallel computer (100) or a subset all the compute nodes (102). Collective operations are often built around point-to-point operations. A collective operation requires that all processes on all compute nodes within an operational group (132) call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group (132). An operational group (132) may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use in systems configured according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group (132). For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group (132). In scatter operation, all processes typically specify the same receive count. The send arguments are only significant to the root process, whose buffer actually contains sendcount*N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduction operation is also a many-to-one collective operation that includes an arithmetic or logical function performed on two data elements. All processes specify the same 'count' and the same arithmetic or logical function. After the reduction, all processes have sent count data elements from compute node send buffers to the root process. In a reduction operation, data elements from corresponding send buffer locations are combined pair-wise by arithmetic or logical operations to yield a single corresponding element in the root process' receive buffer. Application specific reduction operations can be defined at runtime. Parallel communications libraries may support predefined operations. MPI, for example, provides the following predefined reduction operations:

MPI_MAX maximum
MPI_MIN minimum
MPI_SUM sum
MPI_PROD product
MPI_LAND logical and
MPI_BAND bitwise and
MPI_LOR logical or
MPI_BOR bitwise or
MPI_LXOR logical exclusive or
MPI_BXOR bitwise exclusive or In addition to compute nodes, the parallel computer (100) includes input/output ('I/O') nodes (110, 114) coupled to compute nodes (102) through the global combining network (106). The compute nodes (102) in the parallel computer (100) may be partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer (102). For example, in some configurations, each processing set may be composed of eight compute nodes and one I/O node. In some other configurations, each processing set may be composed of sixty-four compute nodes and one I/O node. Such example are for explanation only, however, and not for limitation. Each I/O node provides I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the compute nodes, and so on. Service node (116) runs a service application (124) and communicates with users (128) through a service application interface (126) that runs on computer terminal (122).

The parallel computer (100) of FIG. 1 operates generally for performing a rooted-v collective operation by an operational group of compute nodes in a parallel computer in accordance with embodiments of the present invention. A rooted-v collective operation is a collective operation that is carried out in a tree-like topology where the origination or the final destination of contribution data is a single compute node of an operational group designated as the root node of the group. The 'v' in 'rooted-v' indicates that the operation is a vector operation in which the contribution data of each compute node carrying out the rooted-v operation may be of varying sizes, or 'counts.' By contrast, in collective operations that are rooted but not vector operations, each compute node provides contribution data of the same count. Examples of such rooted-v operations include scatterv and gatherv.

The parallel computer (100) of FIG. 1 may perform a rooted-v collective operation by: upon encountering a rooted-v collection operation during execution, identifying, by a root node of an operational group of compute nodes, a count to use for the selection of a collective algorithm for effecting the rooted-v collective operation. The root node, in this example, may be aware of the counts to be used by each of the other compute nodes in the operational group for the rooted-v collective operation. Each of the other compute nodes, however, is aware of only its own count to be used in the collective operation. To that end, the root node, with knowledge of all of the various counts to be used by the compute nodes in the operational group, identifies one count to use for selection of an algorithm to carry out the rooted-v collective operation. The identified count may be an average of all of the counts, a maximum of all of the counts, or a minimum of all of the counts, for example.

The root node may then broadcast, to the other computer nodes in the operational group, an active message that includes the identified count to use for the selection of the collective algorithm. Active messages are communications primitives for exploiting the full performance and flexibility of modern computer interconnects. Active messages are often classified as one of the three main types of distributed memory programming, the other two being data parallel and message passing. Each active message may include a header containing the address of a userspace handler to be executed upon message arrival, with the contents of the message passed as an argument to the handler. In other embodiments, the active message may contain the code to be executed itself In this example, the active message broadcast from the root node to all other nodes may indicate a handler that causes the root node to gather, from all other nodes, a predefined value, such as one and broadcast to the other nodes the combination of the predefined values and the count. That is, the active message may cause the performance of an ALLGATHER operation in which all nodes, other than the root node, provide the same predefined value, and the root node provides the count (a value other than the predefined value). In an ALLGATHER operation, values are collected from all nodes, combined, and the resulting combination is broadcast to all nodes. Consider, for example, that all nodes contribute a value of one to the combination and the root node contributes a value of eight. The broadcast combination would include all ones and one eight. The compute nodes may use the value of eight, as described below in greater detail, as a count to select an algorithm to carry out the rooted-v collective operation.

To that end, all of the compute nodes select, based on the identified count, a same collective algorithm to effect the rooted-v collective operation and execute the rooted-v collective operation by all compute nodes of the operational group using the selected algorithm.

Performing a rooted-v collective operation by an operational group of compute nodes according to embodiments of the present invention is generally implemented on a parallel computer that includes a plurality of compute nodes organized for collective operations through at least one data communications network. In fact, such computers may include thousands of such compute nodes. Each compute node is in turn itself a kind of computer composed of one or more computer processing cores, its own computer memory, and its own input/output adapters. For further explanation, therefore, FIG. 2 sets forth a block diagram of an example compute node (102) useful for performing a rooted-v collective operation by an operational group of compute nodes in a parallel computer according to embodiments of the present invention. The compute node (102) of FIG. 2 includes a plurality of processing cores (165) as well as RAM (156). The processing cores (165) of FIG. 2 may be configured on one or more integrated circuit dies. Processing cores (165) are connected to RAM (156) through a high-speed memory bus (155) and through a bus adapter (194) and an extension bus (168) to other components of the compute node. Stored in RAM (156) is an application program (159), a module of computer program instructions that carries out parallel, user-level data processing using parallel algorithms.

Also stored RAM (156) is a parallel communications library (161), a library of computer program instructions that carry out parallel communications among compute nodes, including point-to-point operations as well as collective operations. A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (102) of FIG. 2, another factor that decreases the demands on the operating system. The operating system (162) may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Windows XP™, AIX™, IBM's i5/OS™, and others as will occur to those of skill in the art.

Figure 2:
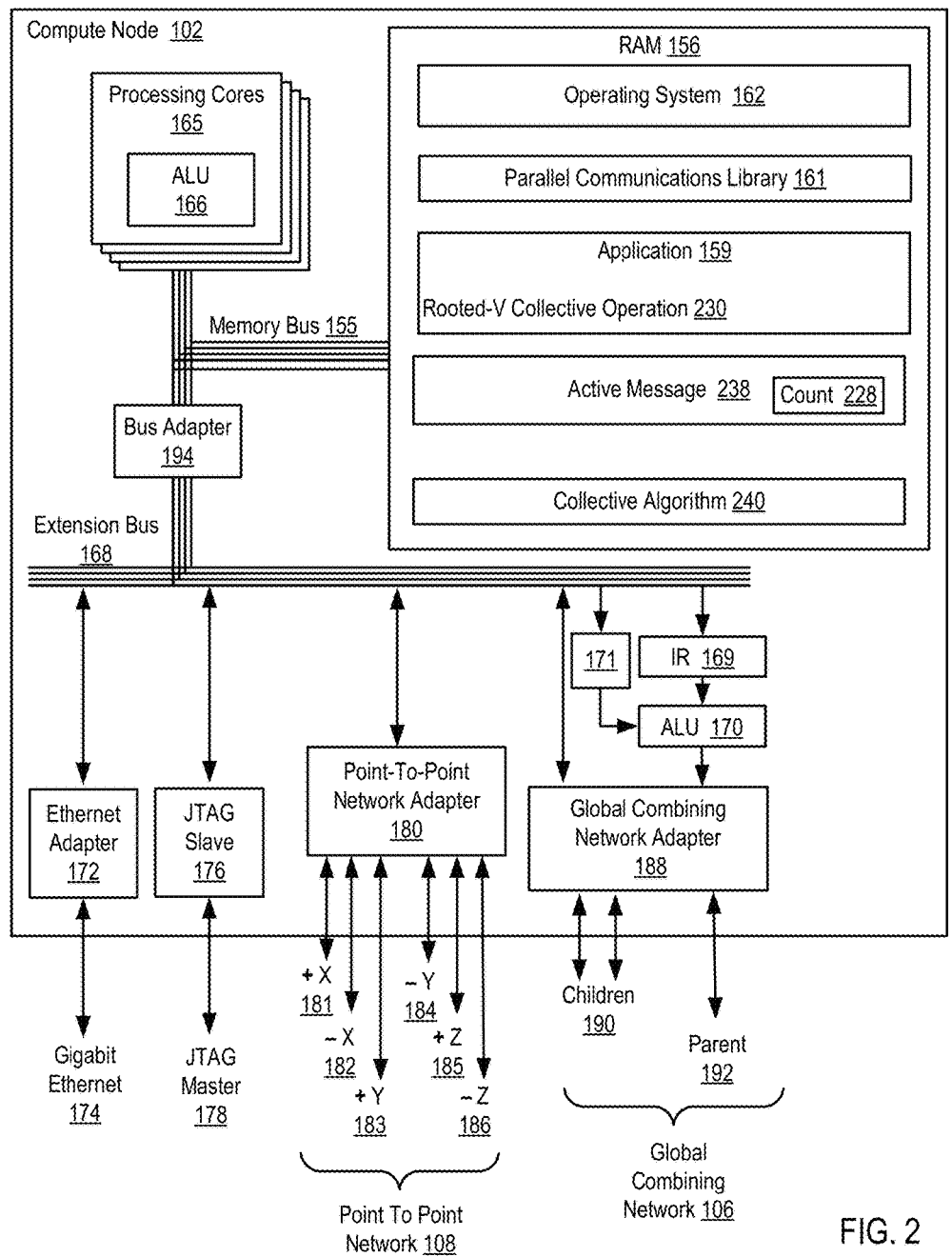
FIG. 2 sets forth a block diagram of an example compute node useful in performing a rooted-v collective operation by an operational group of compute nodes in a parallel computer according to embodiments of the present invention.

The example application (159), of FIG. 2 may include a rooted-v collective operation (230), such as a GATHERV or SCATTERV operation. Further, the compute node (102) may be a root node of a collection of compute nodes organized in a tree-like network topology. Upon encountering the rooted-v collection operation during execution, the root node (102) may identify a count (228) to use for the selection of a collective algorithm for effecting the rooted-v collective operation; broadcast, to the other computer nodes in the operational group through one or more communications adapters described below, an active message (238) that includes the identified count (228) to use for the selection of the collective algorithm; selecting, by all the compute nodes of the operational group based on the identified count, a same collective algorithm (240) to effect the rooted-v collective operation; and executing the rooted-v collective operation by all compute nodes of the operational group using the selected algorithm.

The example compute node (102) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in apparatus useful for performing a rooted-v collective operation by an operational group of compute nodes in a parallel computer include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (102) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (102) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient alternative access point into the system. The example compute node of FIG. 2 may be all three of these: It typically includes one or more integrated circuits installed on a printed circuit board and may be implemented as an embedded system having its own processing core, its own memory, and its own I/O capability. JTAG boundary scans through JTAG Slave (176) may efficiently configure processing core registers and memory in compute node (102) for use in dynamically reassigning a connected node to a block of compute nodes useful in systems for performing a rooted-v collective operation by an operational group of compute nodes in a parallel computer to embodiments of the present invention.

The data communications adapters in the example of FIG. 2 include a Point-To-Point Network Adapter (180) that couples example compute node (102) for data communications to a network (108) that is optimal for point-to-point message passing operations such as, for example, a network configured as a three-dimensional torus or mesh. The Point-To-Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 include a Global Combining Network Adapter (188) that couples example compute node (102) for data communications to a global combining network (106) that is optimal for collective message passing operations such as, for example, a network configured as a binary tree. The Global Combining Network Adapter (188) provides data communications through three bidirectional links for each global combining network (106) that the Global Combining Network Adapter (188) supports. In the example of FIG. 2, the Global Combining Network Adapter (188) provides data communications through three bidirectional links for global combining network (106): two to children nodes (190) and one to a parent node (192).

The example compute node (102) includes multiple arithmetic logic units ('ALUs'). Each processing core (165) includes an ALU (166), and a separate ALU (170) is dedicated to the exclusive use of the Global Combining Network Adapter (188) for use in performing the arithmetic and logical functions of reduction operations, including an allreduce operation. Computer program instructions of a reduction routine in a parallel communications library (161) may latch an instruction for an arithmetic or logical function into an instruction register (169). When the arithmetic or logical function of a reduction operation is a 'sum' or a 'logical OR,' for example, the collective operations adapter (188) may execute the arithmetic or logical operation by use of the ALU (166) in the processing core (165) or, typically much faster, by use of the dedicated ALU (170) using data provided by the nodes (190, 192) on the global combining network (106) and data provided by processing cores (165) on the compute node (102).

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processing cores (165) on the compute node (102) contribute data that alters the output of ALU (170), which is then passed up or down the global combining network (106). Because the ALU (170) typically does not output any data onto the network (106) until the ALU (170) receives input from one of the processing cores (165), a processing core (165) may inject the identity element into the dedicated ALU (170) for the particular arithmetic operation being perform in the ALU (170) in order to prevent alteration of the output of the ALU (170). Injecting the identity element into the ALU, however, often consumes numerous processing cycles. To further enhance performance in such cases, the example compute node (102) includes dedicated hardware (171) for injecting identity elements into the ALU (170) to reduce the amount of processing core resources required to prevent alteration of the ALU output. The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106).

Figure 3:
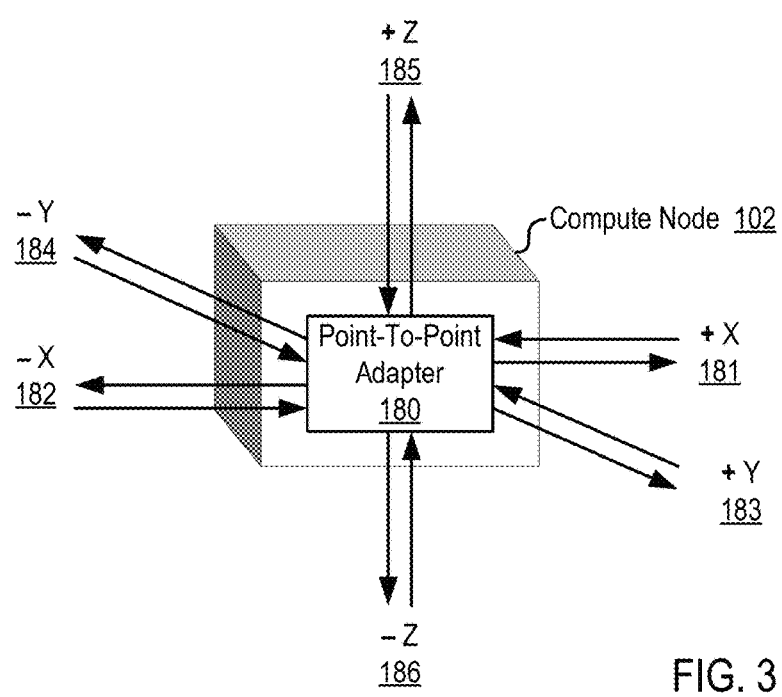
FIG. 3 sets forth a block diagram of an example Point-To-Point Adapter useful in systems for performing a rooted-v collective operation by an operational group of compute nodes in a parallel computer according to embodiments of the present invention.

For further explanation, FIG. 3 sets forth a block diagram of an example Point-To-Point Adapter (180) useful in systems for performing a rooted-v collective operation by an operational group of compute nodes in a parallel computer according to embodiments of the present invention. The Point-To-Point Adapter (180) is designed for use in a data communications network optimized for point-to-point operations, a network that organizes compute nodes in a three-dimensional torus or mesh. The Point-To-Point Adapter (180) in the example of FIG. 3 provides data communication along an x-axis through four unidirectional data communications links, to and from the next node in the −x direction (182) and to and from the next node in the +x direction (181). The Point-To-Point Adapter (180) of FIG. 3 also provides data communication along a y-axis through four unidirectional data communications links, to and from the next node in the −y direction (184) and to and from the next node in the +y direction (183). The Point-To-Point Adapter (180) of FIG. 3 also provides data communication along a z-axis through four unidirectional data communications links, to and from the next node in the −z direction (186) and to and from the next node in the +z direction (185).

Figure 4:
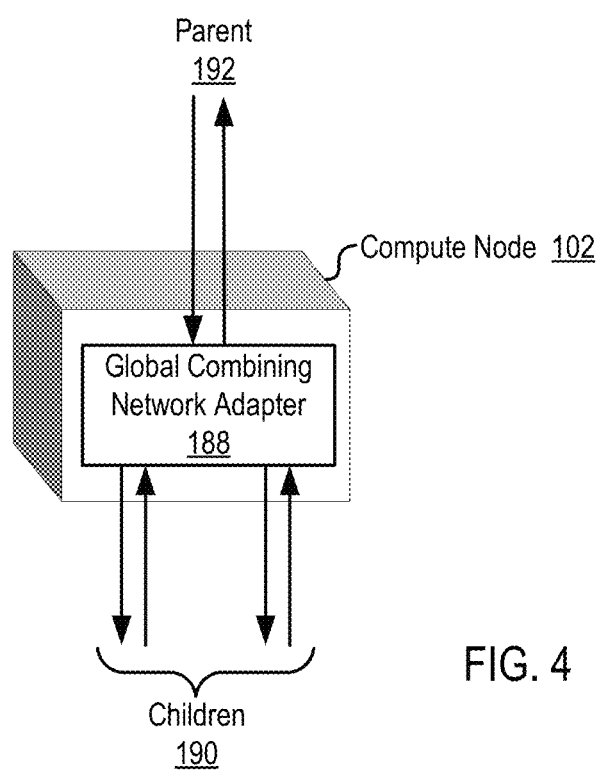
FIG. 4 sets forth a block diagram of an example Global Combining Network Adapter useful in systems for performing a rooted-v collective operation by an operational group of compute nodes in a parallel computer according to embodiments of the present invention.

For further explanation, FIG. 4 sets forth a block diagram of an example Global Combining Network Adapter (188) useful in systems for performing a rooted-v collective operation by an operational group of compute nodes in a parallel computer according to embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 4 provides data communication to and from children nodes of a global combining network through four unidirectional data communications links (190), and also provides data communication to and from a parent node of the global combining network through two unidirectional data communications links (192).

Figure 5:
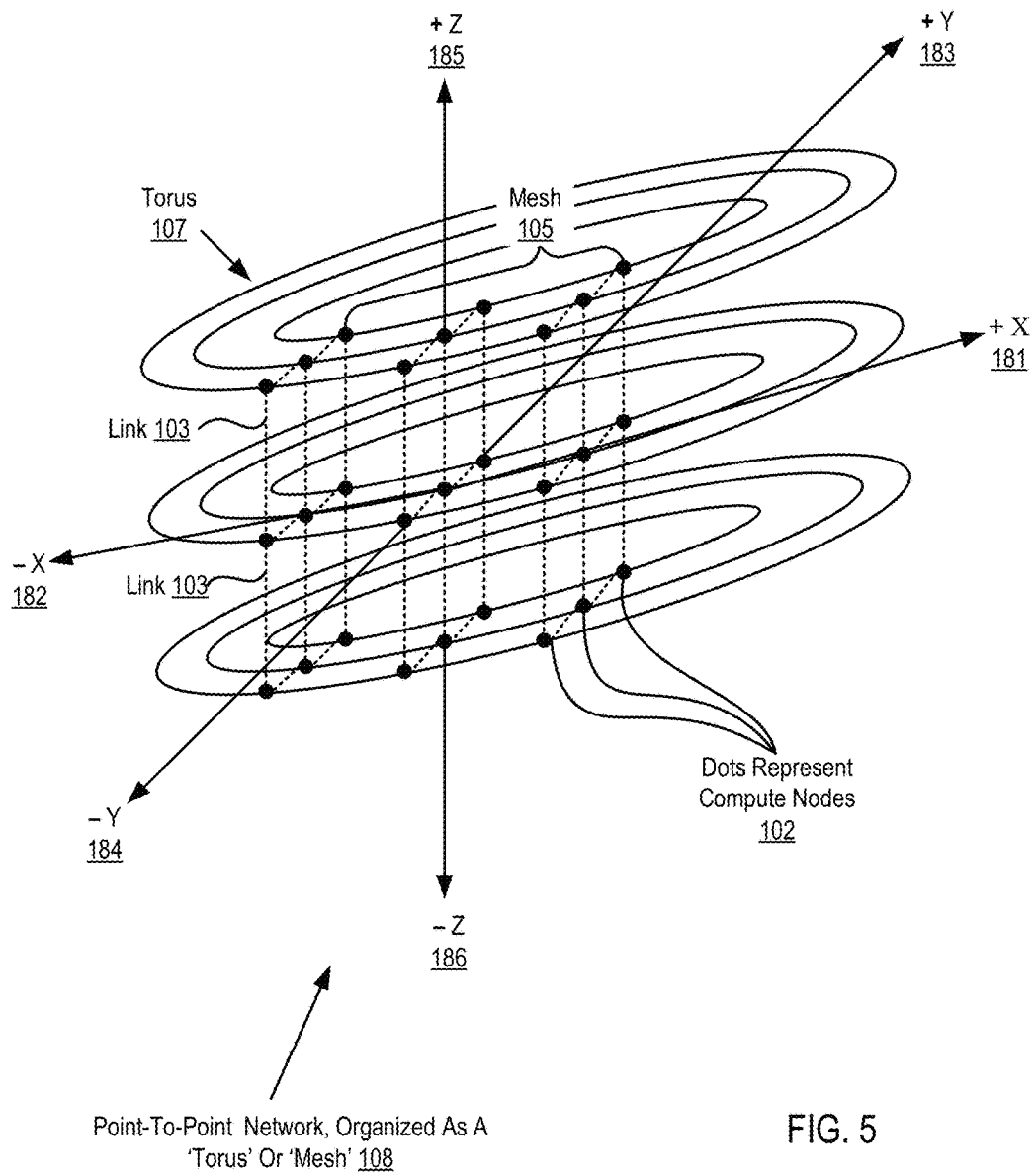
FIG. 5 sets forth a line drawing illustrating an example data communications network optimized for point-to-point operations useful in systems capable of performing a rooted-v collective operation by an operational group of compute nodes in a parallel computer according to embodiments of the present invention.

For further explanation, FIG. 5 sets forth a line drawing illustrating an example data communications network (108) optimized for point-to-point operations useful in systems capable of performing a rooted-v collective operation by an operational group of compute nodes in a parallel computer according to embodiments of the present invention. In the example of FIG. 5, dots represent compute nodes (102) of a parallel computer, and the dotted lines (103) between the dots represent data communications links between compute nodes. The data communications links are implemented with point-to-point data communications adapters similar to the one illustrated for example in FIG. 3, with data communications links on three axis, x, y, and z, and to and fro in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 5 is illustrated with only 27 compute nodes, but readers will recognize that a data communications network optimized for point-to-point operations for use in performing a rooted-v collective operation by an operational group of compute nodes in a parallel computer in accordance with embodiments of the present invention may contain only a few compute nodes or may contain thousands of compute nodes. For ease of explanation, the data communications network of FIG. 5 is illustrated with only three dimensions, but readers will recognize that a data communications network optimized for point-to-point operations for use in performing a rooted-v collective operation by an operational group of compute nodes in a parallel computer in accordance with embodiments of the present invention may in fact be implemented in two dimensions, four dimensions, five dimensions, and so on. Several supercomputers now use five dimensional mesh or torus networks, including, for example, IBM's Blue Gene Q™.

Figure 6:
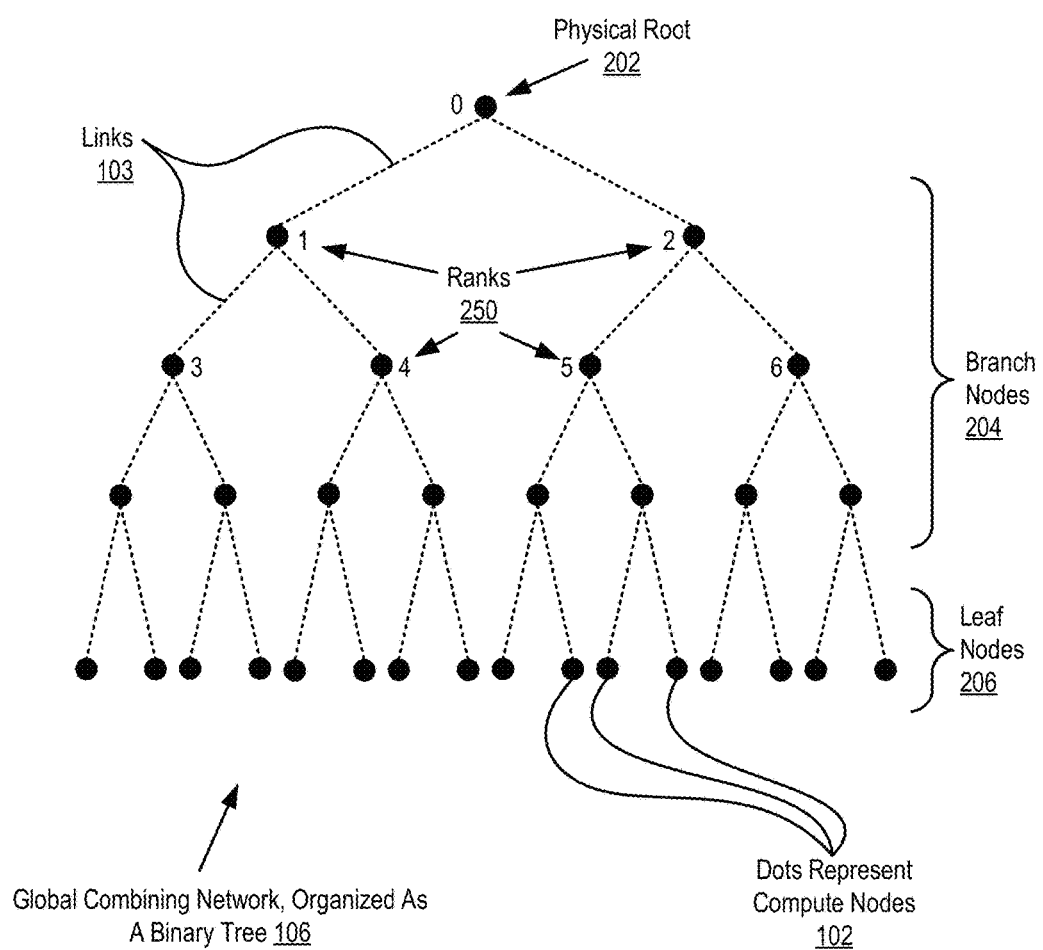
FIG. 6 sets forth a line drawing illustrating an example global combining network useful in systems capable of performing a rooted-v collective operation by an operational group of compute nodes in a parallel computer according to embodiments of the present invention.

For further explanation, FIG. 6 sets forth a line drawing illustrating an example global combining network (106) useful in systems capable of performing a rooted-v collective operation by an operational group of compute nodes in a parallel computer according to embodiments of the present invention. The example data communications network of FIG. 6 includes data communications links (103) connected to the compute nodes so as to organize the compute nodes as a tree. In the example of FIG. 6, dots represent compute nodes (102) of a parallel computer, and the dotted lines (103) between the dots represent data communications links between compute nodes. The data communications links are implemented with global combining network adapters similar to the one illustrated for example in FIG. 4, with each node typically providing data communications to and from two children nodes and data communications to and from a parent node, with some exceptions. Nodes in the global combining network (106) may be characterized as a physical root node (202), branch nodes (204), and leaf nodes (206). The physical root (202) has two children but no parent and is so called because the physical root node (202) is the node physically configured at the top of the binary tree. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 6 is illustrated with only 31 compute nodes, but readers will recognize that a global combining network (106) optimized for collective operations for use in performing a rooted-v collective operation by an operational group of compute nodes in a parallel computer in accordance with embodiments of the present invention may contain only a few compute nodes or may contain thousands of compute nodes.

In the example of FIG. 6, each node in the tree is assigned a unit identifier referred to as a 'rank' (250). The rank actually identifies a task or process that is executing a parallel operation according to embodiments of the present invention. Using the rank to identify a node assumes that only one such task is executing on each node. To the extent that more than one participating task executes on a single node, the rank identifies the task as such rather than the node. A rank uniquely identifies a task's location in the tree network for use in both point-to-point and collective operations in the tree network. The ranks in this example are assigned as integers beginning with 0 assigned to the root tasks or root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 7:
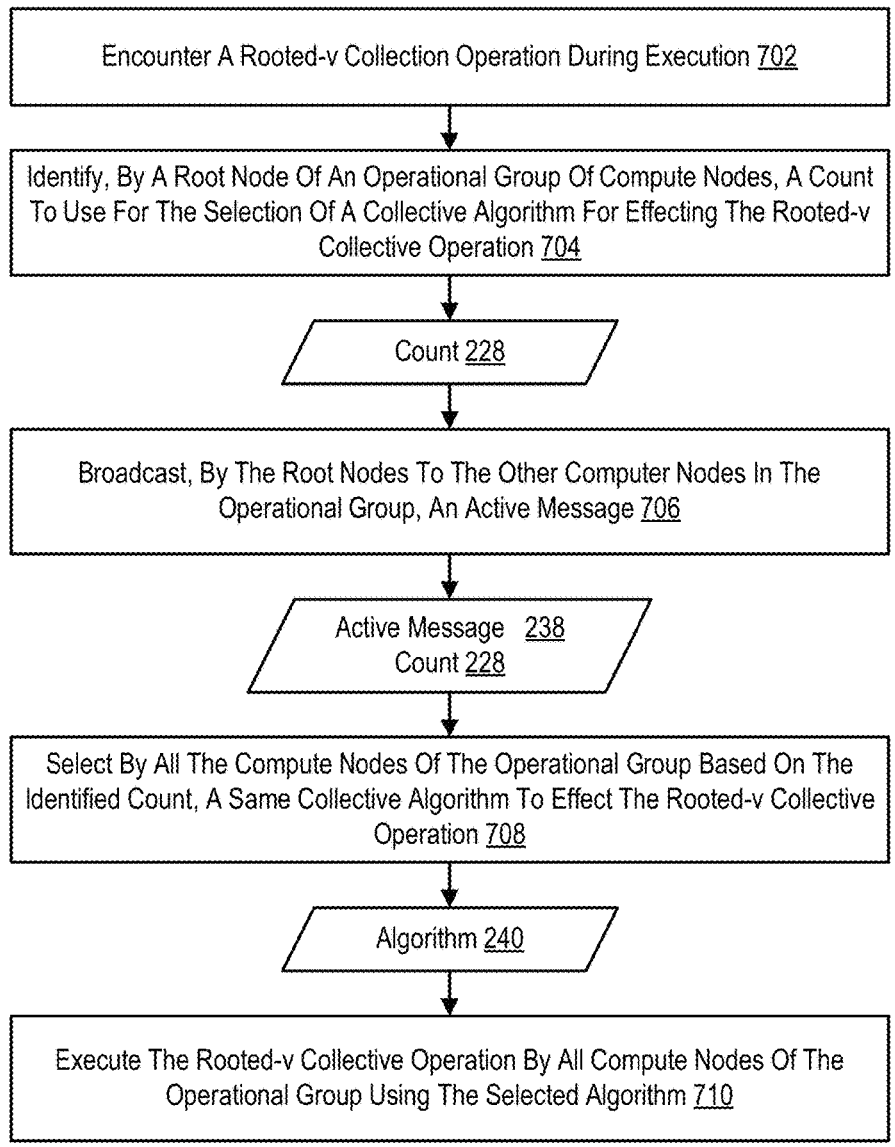
FIG. 7 sets forth a flow chart illustrating an example method of performing a rooted-v collective operation by an operational group of compute nodes in a parallel computer according to embodiments of the present invention.

For further explanation, the method of FIG. 7 sets forth a flow chart illustrating an example method of performing a rooted-v collective operation by an operational group of compute nodes in a parallel computer according to embodiments of the present invention. The method of FIG. 7 includes encountering (702) a rooted-v collection operation during execution. Encountering (702) a rooted-v collective operation during execution may be carried out by any of the compute nodes of the operational group. Encountering such a rooted-v collective operation may include encountering a gatherv or scatterv collective operation during execution. Each such rooted-v collective operation may be coded such that the root node, upon such an encounter, then identifies (704) a count (228) to use for the selection of a collective algorithm for effecting the rooted-v collective operation. Identifying a count may be carried out through one or more calculations or sorting of counts. A count as the term is used in this specification is a size of contribution data of a compute node.

The method of FIG. 7 also includes broadcasting (706), by the root node to the other computer nodes in the operational group, an active message. The active message (228) includes the identified count (228) to use for the selection of the collective algorithm. Broadcasting (706) such an active message may be carried out through data communications along the tree topology within which the compute nodes are organized.

The method of FIG. 7 also includes selecting (708) by all the compute nodes of the operational group based on the identified count (228), a same collective algorithm (250) to effect the rooted-v collective operation. Selecting (708) a collective algorithm based on a count may be carried out in a variety of ways. For example, a compute node may select an algorithm of a set of algorithms where each algorithm is associated with a range of counts. Consider a set, for example, of three algorithms, one associated with counts less than 64, one associated with counts between 64 and 1024, and one associated with counts greater than 1024. Each compute node, upon receiving the identified count of, say, 1024, will select the algorithm associated with counts between 64 and 1024.

The method of FIG. 7 also includes executing (710) the rooted-v collective operation by all compute nodes of the operational group using the selected algorithm. In this way, each of the compute nodes in the operational group, regardless of the count of that compute node, will execute the same algorithm based on count.

Figure 8:
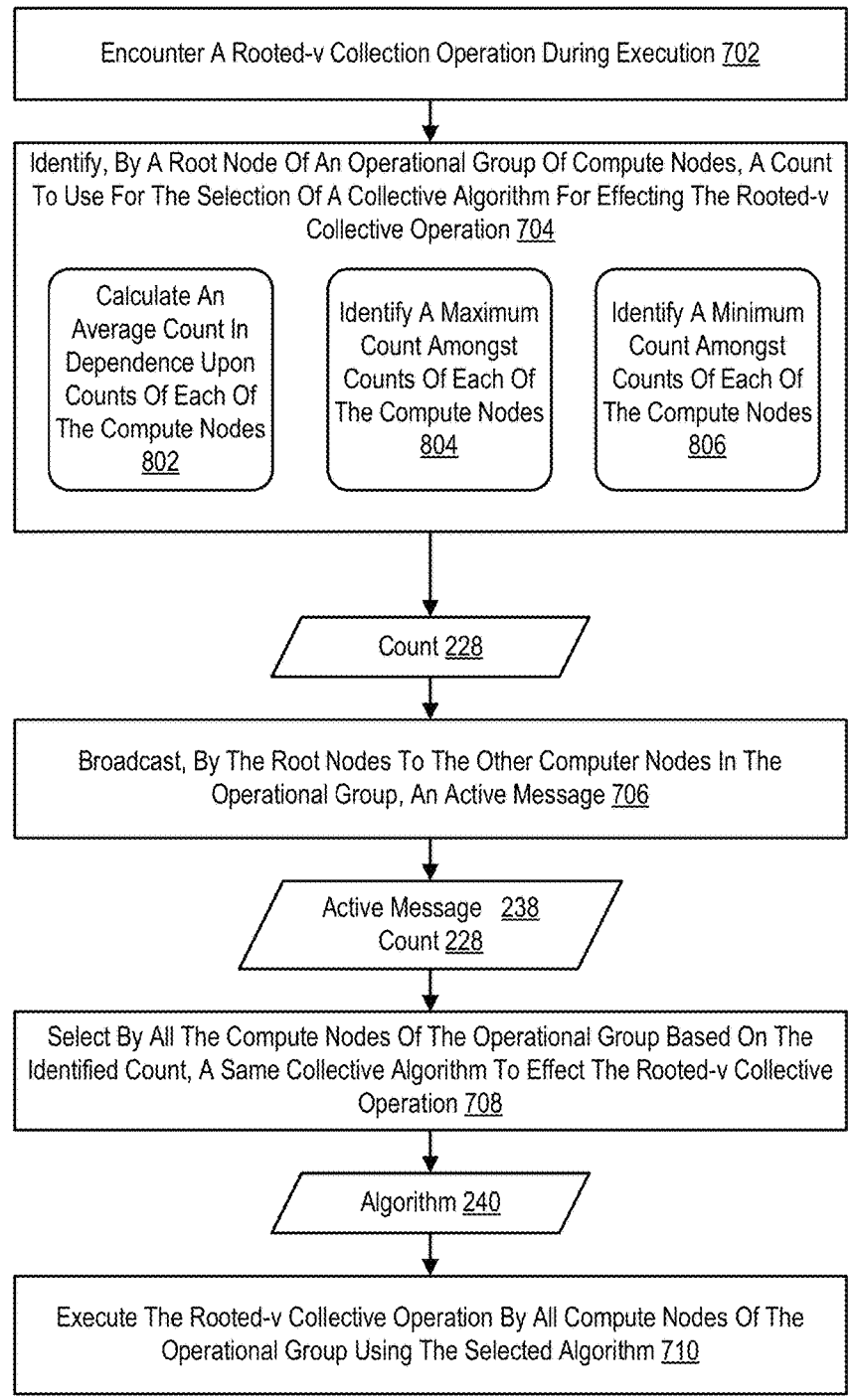
FIG. 8 sets forth a flow chart illustrating another example method for performing a rooted-v collective operation by an operational group of compute nodes in a parallel computer according to embodiments of the present invention.

For further explanation, the method of FIG. 8 sets forth a flow chart illustrating another example method of performing a rooted-v collective operation by an operational group of compute nodes in a parallel computer according to embodiments of the present invention. The method of FIG. 8 is similar to the method of FIG. 7 in that the method of FIG. 8 also includes encountering (702) a rooted-v collection operation during execution; identifying (704), by a root node of an operational group of compute nodes, a count to use for the selection of a collective algorithm for effecting the rooted-v collective operation; broadcasting (706), by the root node to the other computer nodes in the operational group, an active message, wherein the active message includes the identified count to use for the selection of the collective algorithm; selecting (708) by all the compute nodes of the operational group based on the identified count, a same collective algorithm to effect the rooted-v collective operation; and executing (710) the rooted-v collective operation by all compute nodes of the operational group using the selected algorithm.

The method of FIG. 8 differs from the method of FIG. 7, however, in the method of FIG. 8 depicts several alternatives for identifying (704) a count to use for the selection of a collective algorithm for effecting the rooted-v collective operation. For example, in the method of FIG. 7, identifying (704) a count to use for the selection of a collective algorithm for effecting the rooted-v collective operation may be carried out by calculating (802) an average count in dependence upon counts of each of the compute nodes in the operational group of compute nodes. Here, once the root node is aware of the counts each other compute node will utilize in effective the rooted-v operation, the root node may add the counts together and divide by the number of compute nodes. The root node's count may also be included the calculation.

Also in the method of FIG. 8, identifying (704) a count to use for the selection of a collective algorithm for effecting the rooted-v collective operation may include identifying (804) a maximum count amongst counts of each of the compute nodes in the operational group of compute nodes or identifying (806) a minimum count amongst counts of each of the compute nodes in the operational group of compute nodes.

Figure 9:
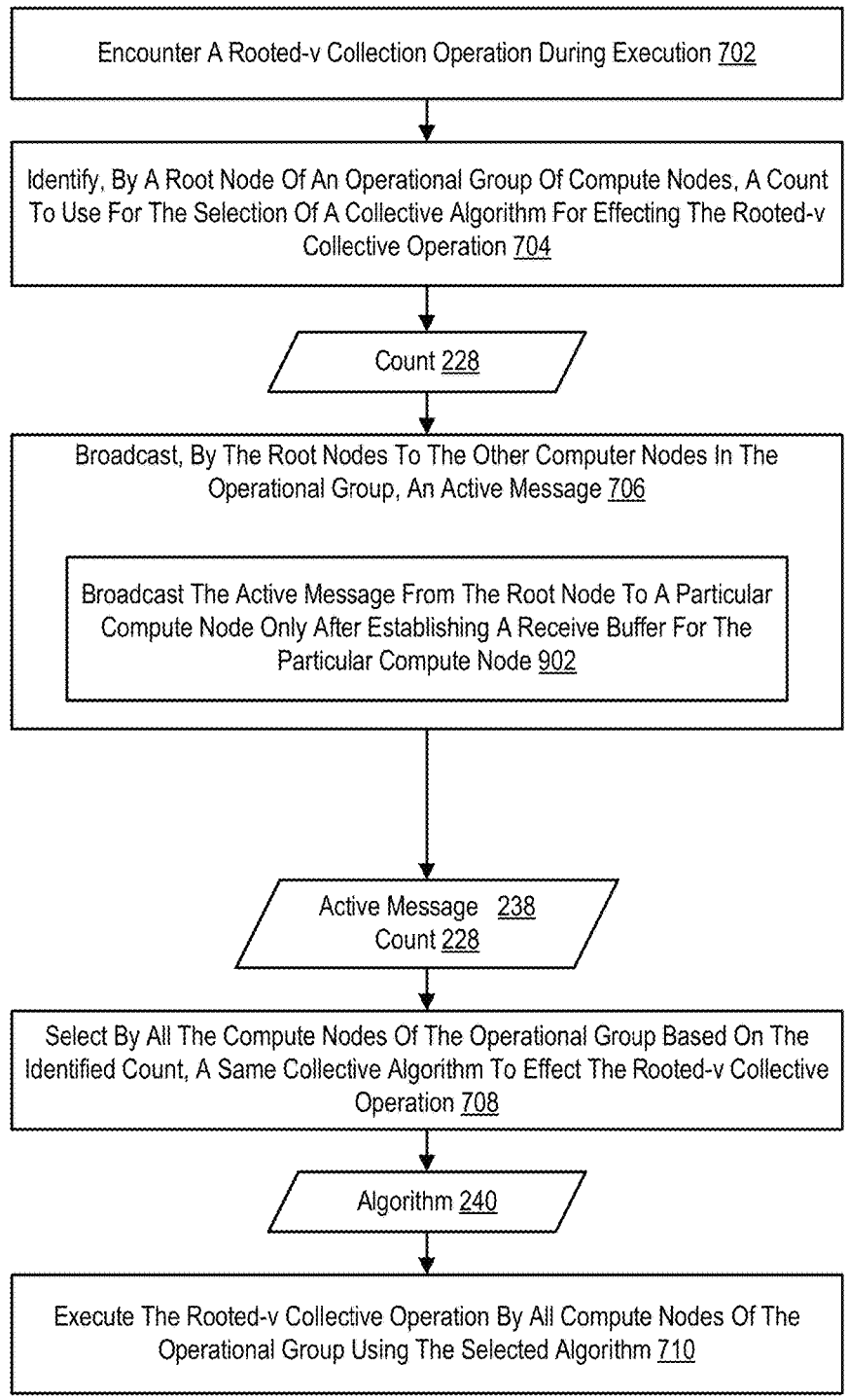
FIG. 9 sets forth a flow chart illustrating another example method for performing a rooted-v collective operation by an operational group of compute nodes in a parallel computer according to embodiments of the present invention.

For further explanation, the method of FIG. 9 sets forth a flow chart illustrating another example method of performing a rooted-v collective operation by an operational group of compute nodes in a parallel computer according to embodiments of the present invention. The method of FIG. 9 is similar to the method of FIG. 7 in that the method of FIG. 9 also includes encountering (702) a rooted-v collection operation during execution; identifying (704), by a root node of an operational group of compute nodes, a count to use for the selection of a collective algorithm for effecting the rooted-v collective operation; broadcasting (706), by the root node to the other computer nodes in the operational group, an active message, wherein the active message includes the identified count to use for the selection of the collective algorithm; selecting (708) by all the compute nodes of the operational group based on the identified count, a same collective algorithm to effect the rooted-v collective operation; and executing (710) the rooted-v collective operation by all compute nodes of the operational group using the selected algorithm.

The method of FIG. 9 differs from the method of FIG. 7, however, in that in the method of FIG. 9 broadcasting (706) the active message to the compute nodes of the organizational group is carried out by broadcasting (902) the active message from the root node to a particular compute node only after establishing a receive buffer for the particular compute node. For performance of a gatherv operation, the root node must establish a receive buffer for each compute node of the size of the count of contribution data to be received from the compute node. To that end, in the method of FIG. 9, the root node may effectively implement some flow control in the operational group by only broadcasting to each compute node the active message after establishing the receive buffer for that compute node. Without such flow control, the child nodes in the tree may perform the rooted-v operation and provide contribution data to the root node prior to the root node having established a receive buffer for the child nodes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of performing a rooted-v collective operation by an operational group of compute nodes in a parallel computer, the method comprising:
   upon encountering a rooted-v collection operation during execution, identifying, by a root node of an operational group of compute nodes, a count to use for a selection of a collective algorithm for effecting the rooted-v collective operation, wherein the count comprises a size of contribution data contributed by computer nodes of the operational group;
   broadcasting, by the root node to other computer nodes in the operational group, an active message, wherein the active message includes the identified count to use for the selection of the collective algorithm;
   selecting, by all the compute nodes of the operational group based on the identified count, a same collective algorithm to effect the rooted-v collective operation; and
   executing the rooted-v collective operation by all compute nodes of the operational group using the selected algorithm.

2. The method of claim 1 wherein identifying a count to use for the selection of a collective algorithm for effecting the rooted-v collective operation further comprises:
   calculating an average count in dependence upon counts of each of the compute nodes in the operational group of compute nodes.

3. The method of claim 1 wherein identifying a count to use for the selection of a collective algorithm for effecting the rooted-v collective operation further comprises:
   identifying a maximum count amongst counts of each of the compute nodes in the operational group of compute nodes.

4. The method of claim 1 wherein identifying a count to use for the selection of a collective algorithm for effecting the rooted-v collective operation further comprises:
   identifying a minimum count amongst counts of each of the compute nodes in the operational group of compute nodes.

5. The method of claim 1 wherein the rooted-v collective operation comprises a scatterv operation.

6. The method of claim 1 wherein the rooted-v collective operation comprises a gatherv operation.

7. The method of claim 1 wherein:
   broadcasting the active message to the compute nodes of the organizational group further comprises broadcasting the active message from the root node to a particular compute node only after establishing a receive buffer for the particular compute node.

8. An apparatus for performing a rooted-v collective operation by an operational group of compute nodes in a parallel computer, the apparatus comprising a computer processor, a computer memory operatively coupled to the computer processor, the computer memory having disposed within it computer program instructions that, when executed by the computer processor, cause the apparatus to carry out:
   upon encountering a rooted-v collection operation during execution, identifying, by a root node of an operational group of compute nodes, a count to use for a selection of a collective algorithm for effecting the rooted-v collective operation, wherein the count comprises a size of contribution data contributed by computer nodes of the operational group;
   broadcasting, by the root node to other computer nodes in the operational group, an active message, wherein the active message includes the identified count to use for the selection of the collective algorithm;
   selecting, by all the compute nodes of the operational group based on the identified count, a same collective algorithm to effect the rooted-v collective operation; and
   executing the rooted-v collective operation by all compute nodes of the operational group using the selected algorithm.

9. The apparatus of claim 8 wherein identifying a count to use for the selection of a collective algorithm for effecting the rooted-v collective operation further comprises:
   calculating an average count in dependence upon counts of each of the compute nodes in the operational group of compute nodes.

10. The apparatus of claim 8 wherein identifying a count to use for the selection of a collective algorithm for effecting the rooted-v collective operation further comprises:
    identifying a maximum count amongst counts of each of the compute nodes in the operational group of compute nodes.

11. The apparatus of claim 8 wherein identifying a count to use for the selection of a collective algorithm for effecting the rooted-v collective operation further comprises:
    identifying a minimum count amongst counts of each of the compute nodes in the operational group of compute nodes.

12. The apparatus of claim 8 wherein the rooted-v collective operation comprises a scatterv operation.

13. The apparatus of claim 8 wherein the rooted-v collective operation comprises a gatherv operation.

14. The apparatus of claim 8 wherein:
    broadcasting the active message to the compute nodes of the organizational group further comprises broadcasting the active message from the root node to a particular compute node only after establishing a receive buffer for the particular compute node.

15. A computer program product for performing a rooted-v collective operation by an operational group of compute nodes in a parallel computer, the computer program product disposed upon a non-transitory computer readable medium, the computer program product comprising computer program instructions that, when executed, cause a computer to carry out:
    upon encountering a rooted-v collection operation during execution, identifying, by a root node of an operational group of compute nodes, a count to use for a selection of a collective algorithm for effecting the rooted-v collective operation, wherein the count comprises a size of contribution data contributed by computer nodes of the operational group;
    broadcasting, by the root node to other computer nodes in the operational group, an active message, wherein the active message includes the identified count to use for the selection of the collective algorithm;
    selecting, by all the compute nodes of the operational group based on the identified count, a same collective algorithm to effect the rooted-v collective operation; and
    executing the rooted-v collective operation by all compute nodes of the operational group using the selected algorithm.

16. The computer program product of claim 15 wherein identifying a count to use for the selection of a collective algorithm for effecting the rooted-v collective operation further comprises:

calculating an average count in dependence upon counts of each of the compute nodes in the operational group of compute nodes.

17. The computer program product of claim 15 wherein identifying a count to use for the selection of a collective algorithm for effecting the rooted-v collective operation further comprises:
identifying a maximum count amongst counts of each of the compute nodes in the operational group of compute nodes.

18. The computer program product of claim 15 wherein identifying a count to use for the selection of a collective algorithm for effecting the rooted-v collective operation further comprises:
identifying a minimum count amongst counts of each of the compute nodes in the operational group of compute nodes.

19. The computer program product of claim 15 wherein the rooted-v collective operation comprises a scatterv operation.

20. The computer program product of claim 15 wherein the rooted-v collective operation comprises a gatherv operation.

* * * * *